United States Patent [19]
Frank et al.

[11] Patent Number: 5,377,130
[45] Date of Patent: Dec. 27, 1994

[54] METHOD AND APPARATUS FOR SOLVING TERMS OF A NUMERICAL SEQUENCE

[75] Inventors: Olivier L. Frank; Ann E. Phipps, Both of Dallas, Tex.

[73] Assignee: Texas Instruments Incorporated, Dallas, Tex.

[21] Appl. No.: 9,163

[22] Filed: Jan. 26, 1993

[51] Int. Cl.$^5$ .............................................. G06F 3/02
[52] U.S. Cl. ...................... 364/709.12; 364/709.15; 364/710.14; 364/735
[58] Field of Search ............ 364/709.12, 709.14, 364/709.15, 710.14, 735

[56] References Cited

U.S. PATENT DOCUMENTS

| | | | |
|---|---|---|---|
| 4,156,285 | 5/1979 | Olander, Jr. et al. | 364/709.12 |
| 4,695,983 | 9/1987 | Oda et al. | 364/709.12 |
| 4,761,750 | 8/1988 | Yoshino et al. | 364/709.12 |
| 4,845,652 | 7/1989 | Bunsen | 364/709.14 |
| 5,067,102 | 11/1991 | Eisenstein | 364/709.12 |
| 5,134,577 | 7/1992 | Kawawaki | 364/709.15 |
| 5,210,708 | 5/1993 | Negiski | 364/710.14 |
| 5,245,559 | 9/1993 | Lapeyre | 364/710.14 |

OTHER PUBLICATIONS

Husyim Kocak, "What is a Difference Equation", *User's Manual of Phaser*, Springer Verlag, Editor, 1988, Chapter 3, pp. 19–27. (Note: Title page cannot be located).

*Primary Examiner*—David H. Malzahn
*Attorney, Agent, or Firm*—William E. Hiller; Richard L. Donaldson

[57] ABSTRACT

A digital computer (20) is provided for generating a solution of a term of a numerical sequence. The digital computer (20) includes a memory (22). The memory (22) has stored within it solving instructions of a sequence-solving program and recognizing instructions for recognizing the type of numerical sequence. The digital computer (20) also includes a processor (24) for executing the solving instructions and recognizing instructions. An input device (26) receives data from a user. The data represents a mathematical expression of the numerical sequence. The data also represents a value of a term identifier representing the term of the numerical sequence to be solved. A display (28) is also provided for displaying the solution of the term.

20 Claims, 8 Drawing Sheets

FIG. 1

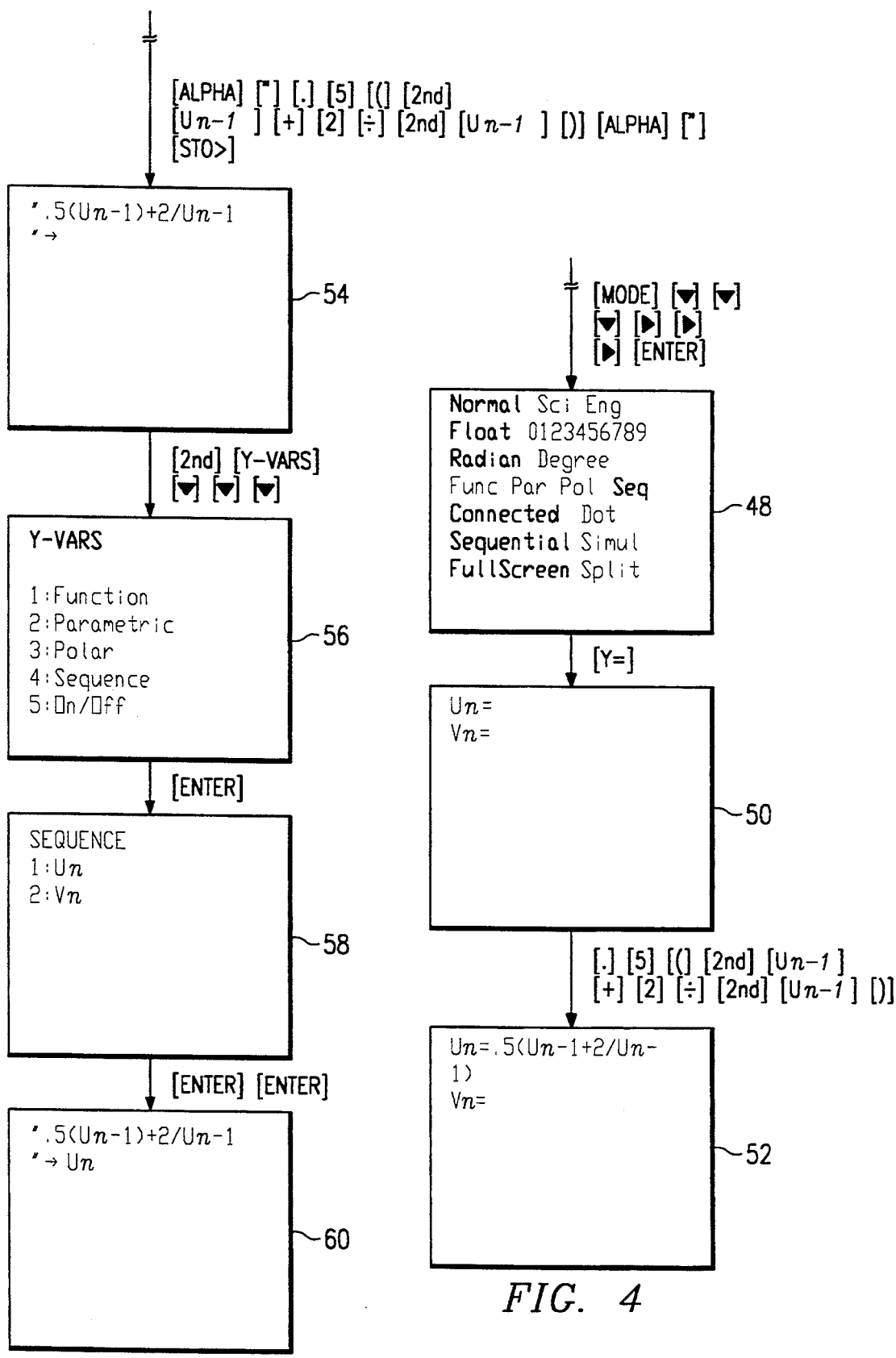

↓
[2nd] [TABLE]

| n | Un |
|---|---|
| 0 | 1 |
| 1 | 1.5 |
| 2 | 1.4167 |
| 3 | 1.4142 |
| 4 | 1.4142 |
| 5 | 1.4142 |
| 6 | 1.4142 | n=0

| n | Un |
|---|---|
| 7 | 1.4142 |
| 8 | 1.4142 |
| 9 | 1.4142 |
| 10 | 1.4142 |
| 11 | 1.4142 |
| 12 | 1.4142 |
| 13 | 1.4142 | n=13

~76

↓ [▼][▼][▼][▼][▼][▼][▼]

| n | Un |
|---|---|
| 14 | 1.4142 |
| 15 | 1.4142 |
| 16 | 1.4142 |
| 17 | 1.4142 |
| 18 | 1.4142 |
| 19 | 1.4142 |
| 20 | 1.4142 | n=20

METHOD AND APPARATUS FOR SOLVING TERMS OF A NUMERICAL SEQUENCE

TECHNICAL FIELD OF THE INVENTION

This invention relates in general to the field of digital computers, and more particularly, to a method and apparatus for solving for the terms of and testing for convergence of numerical sequences.

BACKGROUND OF THE INVENTION

In today's technological society, high level mathematics is being taught to students at an earlier age than ever before. One such high level concept is that of numerical sequences. A numerical sequence is a sequence of numerical entities arranged in correspondence with naturally ordered whole numbers, i.e., 1,2,3, ... The numerical entities are called "terms". Each term is generically identified by a term identifier such as "n". The term identifier is a variable which can be assigned a natural number to identify a particular term. For example, the terms of a particular numerical sequence are represented by "$U_n$" where n is the term identifier.

Where n=3, $U_3$ represents the third term of the numerical sequence $U_n$. When n can equal only a finite number of values, the numerical sequence is finite. When n can equal an infinite number of values, the numerical sequence is infinite.

A typical task is to generate a solution for a particular term of a numerical sequence. The terms of a numerical sequence are traditionally solved using a user-programmed device such as a computer or calculator. One problem is that these devices are relatively expensive. A consequence of this expense is that few high school students have access to these devices.

A second problem with these user-programmed devices is that a program must be written to solve for the terms of the numerical sequence. Unfortunately, many students lack the necessary programming skills to write such a program. Most of a student's initial time and effort, therefore, is spent learning how to program the calculator. This expenditure of time and effort detracts from the student's learning of the concept of numerical sequences.

A third problem with many user-programmed devices is that they do not provide an adequate visual display. A term or group of terms can be represented in a variety of forms. Of these forms, the most useful for teaching include mathematical notation and graph. Existing programmable calculators do not translate the program code describing the terms into either a mathematical notation or graph form.

Therefore, a need has arisen for an improved calculator, accessible to a large number of students, for generating solutions to the terms of a numerical sequence.

SUMMARY OF THE INVENTION

In accordance with the present invention, a digital computer for generating a solution of one or more terms of a numerical sequence is provided. The digital computer includes a memory for storing instructions of a sequence-solving program. The digital computer also includes a processor for executing the instructions. An input device is provided for activating the program and for receiving data via special input keys. The input data represents a mathematical expression of the numerical sequence, as well as a term identifier for the term to be solved. A display is also provided for displaying the solution of the term.

A first technical advantage of the invention is that it is relatively inexpensive and accessible to a large number of students. It has a built-in program for solving numerical sequences, and a sample means for receiving input data from the user. The solved terms of a numerical sequence can be displayed in mathematical notation or graph form.

BRIEF DESCRIPTION OF THE DRAWINGS

For a more complete understanding of the present invention, and the advantages thereof, reference is now made to the following descriptions taken in conjunction with the accompanying drawings, in which:

FIG. 1 is a front view of a calculator having a dedicated program for generating solutions to the terms of a numerical sequence;

FIG. 4 illustrates the procedure for entering in mathematical notation form the terms of the example numerical sequence into the memory of the calculator of FIG. 3;

FIG. 5 illustrates an alternative procedure for entering in mathematical notation form the terms of the example numerical sequence into the memory of the calculator of FIG. 3;

FIG. 8 rates a procedure for generating solutions of a number of sequential terms of the example numerical sequence using the calculator of FIG. 3;

FIG. 9 illustrates a procedure for testing for convergence of the terms of the example numerical sequence using the calculator of FIG. 3:

DETAILED DESCRIPTION OF THE INVENTION

Figure 2:
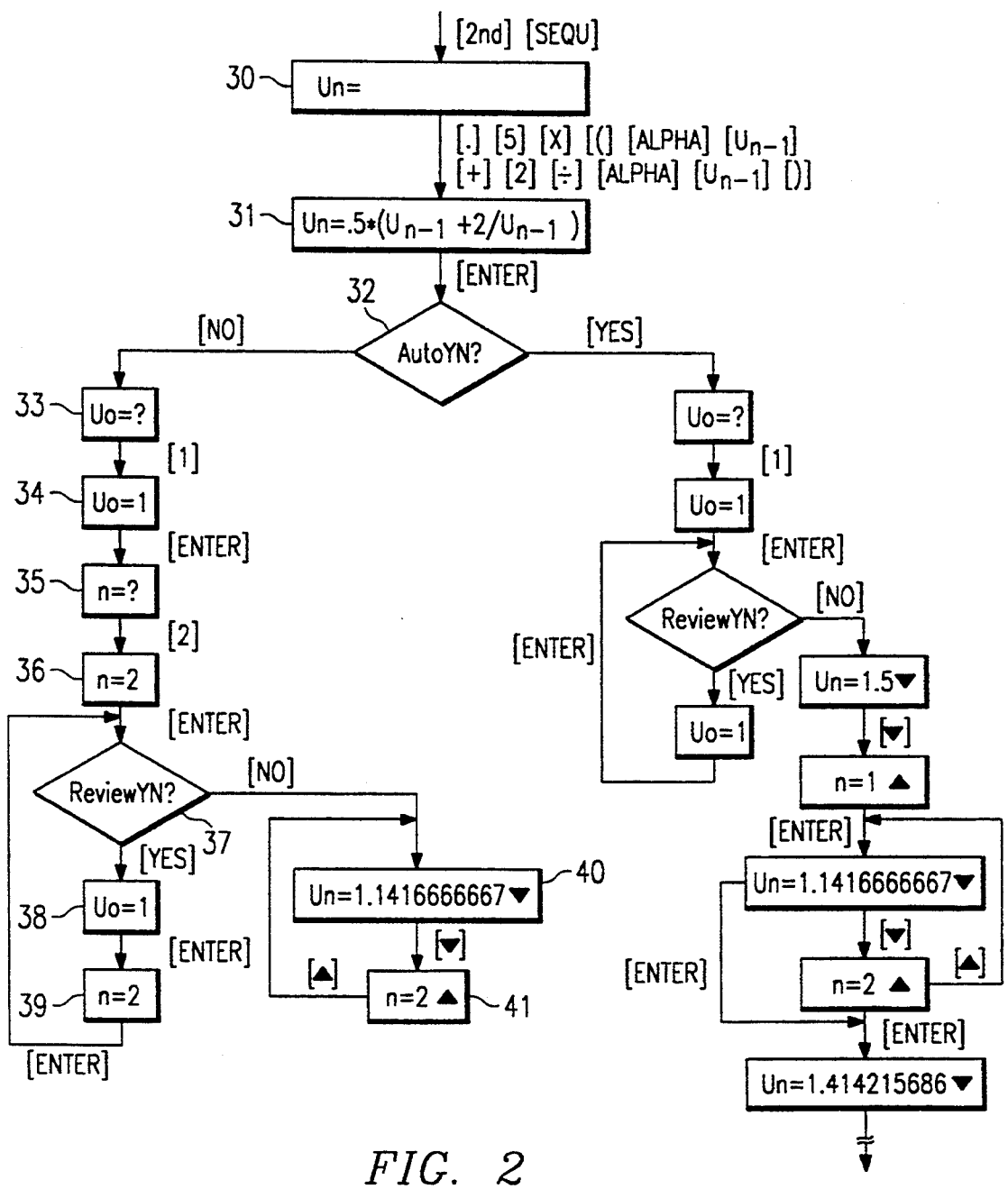
FIG. 2 is a flow chart illustrating the process of entering in mathematical notation form the terms of an example numerical sequence into the memory of the calculator of FIG. 1 and instructing the dedicated program to generate solutions for the terms.

The preferred embodiment of the present invention and its advantages are best understood by referring to FIGS. 1 through 11 of the drawings, like numerals being used for like and corresponding parts of the various drawings.

Figure 1:
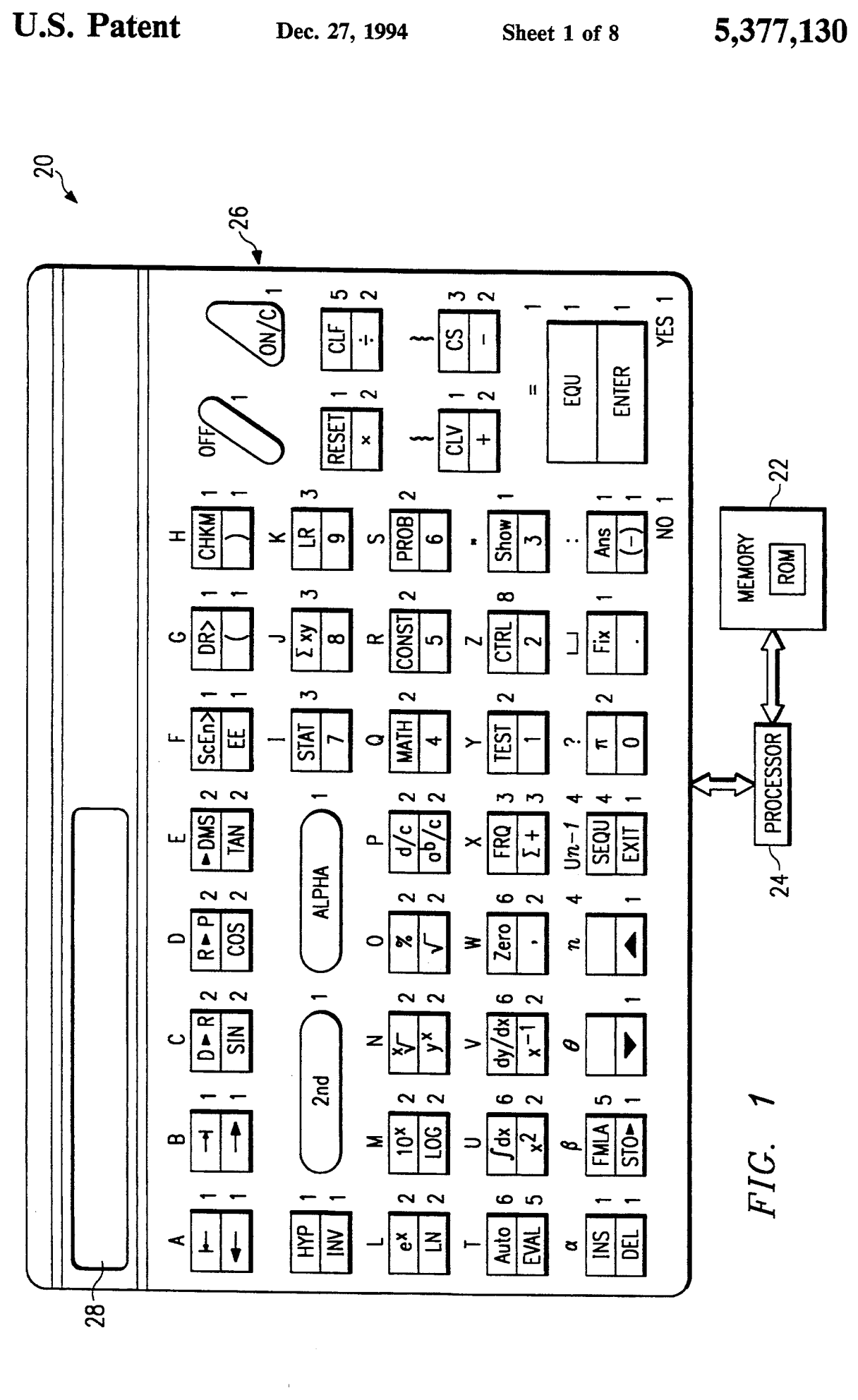

FIG. 1 is a programmable calculator generally indicated at 20. Although calculator 20 is described herein as a conventional calculating device having permanent memory and dedicated keys, the invention described herein could be implemented with any digital computing device having these, features. Calculator 20 has a memory 22 for storing data and for storing programs, i.e., sets of processor instructions, for manipulating data, performing mathematical functions and generating solutions to mathematical expressions. Memory 22 includes a Read Only Memory (ROM) for permanently storing these programs.

Calculator 20 also has a processor 24 for executing the aforementioned programs. Processor 24 includes means for receiving input and generating output, such as a decoder and a display generator respectively.

Calculator 20 further includes an input device 26 for entering data into memory 22 and for activating the programs. In this embodiment, interface 26 is in the form of a keypad. The keys are depressed to enter mathematical expressions, activate the programs and enter information needed to generate solutions to mathematical expressions. Interface 26 provides a dedicated selector key, labeled as "SEQU/EXIT", for activating a program for solving numerical sequences. Once the program is activated, the terms of a numerical sequence in mathematical notation form are entered using interface 26. The terms entered in mathematical notation form are referred to herein as the "mathematical expression" of the numerical sequence. Once the mathematical expression is entered, interface 26 is used to instruct the program to generate solutions for the terms of the numerical sequence. User interface 26 also includes other keys, the functions of which will be explained below in conjunction with FIG. 2.

Calculator 20 further includes a display 28 for displaying the mathematical expression of the entered numerical sequence and other input data, as well a program-generated prompts and solutions of the terms of the numerical sequence. In this embodiment, display 28 is a Liquid Crystal Display (LCD). Display 28 also displays the solutions of the terms of the numerical sequence.

NUMERICAL SEQUENCE

Although there are different types of numerical sequences, for simplicity, only three types will be discussed here. One type of is expressed in mathematical notation form as $U_n = f(n)$, where the solution to the nth term, $U_n$, depends only upon the value of the term identifier n. A second type of numerical sequence is expressed in mathematical notation form as $U_n = f(U_{n-1})$, where the solution to $U_n$ depends only upon the value of the previous term, $U_{n-1}$. The third type is expressed in mathematical notation form as $U_n = f(U_{n-1}, n)$, where the solution to $U_n$ depends on both the value of n and the value of $U_{n-1}$.

For the second and third types of numerical sequences, commonly known as "recursive sequences", the value of $U_0$ is given as an initial condition and the solution to $U_1$ is generated from $U_0$. Likewise, the solution to each subsequent term of the sequence is generated from the term preceding it. That is, the solution to $U_{n-1}$ is generated before the solution of $U_n$. For example, if the solution to the term $U_7$ (the seventh term of the sequence, i.e., n=7) were desired, the solutions to the previous six terms ($U_1$–$U_6$) are generated before $U_7$ is solved. (Remember that the solution to $U_0$ was given as an initial condition ) As discussed below, calculator 20 generates the solutions to these previous terms before generating a solution for the desired term.

IN OPERATION

Referring again to FIG. 1, in this embodiment, the majority of keys of interface 26 have three levels, each level corresponding to a different function that may be invoked or datum that may be entered. For example, the "SEQU/EXIT" key has three levels, "EXIT", "SEQU", and "$U_{n-1}$". The first level is printed on the bottom portion of the key, the second level on the top portion, and the third level over the top of the key. Thus, for the "SEQU/EXIT" key, "EXIT" is the first level, "SEQU" is the second level, and "$U_{n-1}$" is the third level.

To invoke the first level of a particular key, that key alone is pressed. For example, to invoke the "EXIT" function, the "SEQU/EXIT" key is pressed. To invoke the second level of a particular key, the "2nd" key is first pressed, and then the particular key is pressed. For example, to invoke the "SEQU" function which activates the dedicated program, the "2nd" key is first pressed, and then the "SEQU/EXIT" is pressed. Invoking the third level of a particular key requires the "ALPHA" key to be first pressed, and then the particular key is pressed. Thus, to enter the variable "$U_{n-1}$" into the dedicated program, the "ALPHA" key is first pressed, and then the "SEQU/EXIT" key.

FIG. 2 is a flow chart illustrating the steps for generating solutions to the terms of a certain numerical sequence. The interior of the rectangles and diamonds show what is displayed on display 28 at any given step. The brackets represent keys that have been pressed to flow from one display to another. For clarity, only the level of the key which is invoked is included within the brackets, and only that level is mentioned in the following discussion.

The particular sequence illustrated in FIG. 2 is $U_n = 0.5*(U_{n-1} + 2/U_{n-1})$. This sequence is of the second type, as discussed above, and is used for purposes of example. It is understood that the terms of other types of sequences are solved following generally the same steps. Calculator 20 parses the mathematical expression entered for the sequence to determine which types of terms are included in the expression. By identifying the types of terms in the expression, calculator 20 determines which type of numerical sequence is entered in order that it may properly prompt the user for additional data and solve the sequence. For the above sample expression, calculator 20 would recognize the term "$U_{n-1}$" and determine the expression was of the second type and generate appropriate prompts, such as "$U_0=?$". In this embodiment, calculator 20 can generate solutions of the terms of any of the three types of sequences discussed above. Other embodiments of calculator 20 may be able to recognize other types of numerical sequences and generate solutions for their terms without departing from the spirit and scope of the invention.

In order to activate the dedicated program for numerical sequences, the "2nd" key and then the "SEQU" key are depressed. This generates the display shown in block 30 of FIG. 2. Next, the mathematical expression is entered as shown between blocks 30 and 31, using the sequence input key "$U_{n-1}$" to enter $U_{n-1}$. When the expression is completely entered, display 28 displays the complete mathematical expression for the sequence, as shown in block 31.

Next, the "ENTER" key is pressed to enter the numeric sequence into memory 22 so the program can instruct processor 24 to prompt for and receive a term default decision from the user. For this decision, the program instructs processor 24 to display the prompt "AUTO YN?", as shown in block 32. The user then chooses between having calculator 20 automatically generate a solution for a default term (n=1), or having calculator 20 generate a solution for a user-selected term. The former is selected by pressing the "YES" key shown at the bottom right of interface 26. If "YES" is selected, the program will solve for $U_1$ automatically. The latter is selected by depressing the "NO" key. If "NO" is selected, a value for n must then be entered, as discussed below. The programming of memory 22 causes processor 24 to recognize input from the "YES" and "NO" levels for their respective keys. The "NO" path of FIG. 2 is described below. A primary difference between the "YES" and the "NO" paths is that the "YES" path does not require a value for n to be entered, because the program assigns a default value of "1" to term identifier n. Each time an increment key is pressed, n is incremented by one. In this embodiment, the "ENTER" key is the increment key.

After the "NO" key is pressed, the program prompts the user to enter initial condition data, if the sequence is of a type that requires such data for solution. Accordingly, the program prompts the user for the value of $U_0$ (the initial condition of the sequence when n=0) as shown in block 33. In this example, "1" is entered, and this choice is reflected by display 28 as shown in block 34. (If the sequence was of the first type there would be no prompt for $U_0$ because a type 1 sequence needs no initial condition.)

After pressing the "ENTER" key, the program prompts the user to enter a value of n, which identifies the term of the sequence to be solved. FIG. 2 shows the steps for entering a "2" for the value of n, as reflected by display 28 in blocks 35 and 36.

Referring again to FIG. 2, after the value of n has been entered into memory 22 by pressing the "ENTER" key, the prompt "REVIEW" YN? "is displayed as shown in diamond 37. A choice must now be made whether to review the values of $U_0$ and n, or to begin generating solutions for the terms of the sequence. If the former is desired, the "YES" key is pressed to display the values of $U_0$ and n as shown in blocks 38 and 39. The values previously entered for U0 and n may be changed at this time. The "REVIEW YN? "prompt of diamond 37 is once again displayed, with the same choice, as defined above, to be made.

Figure 3:
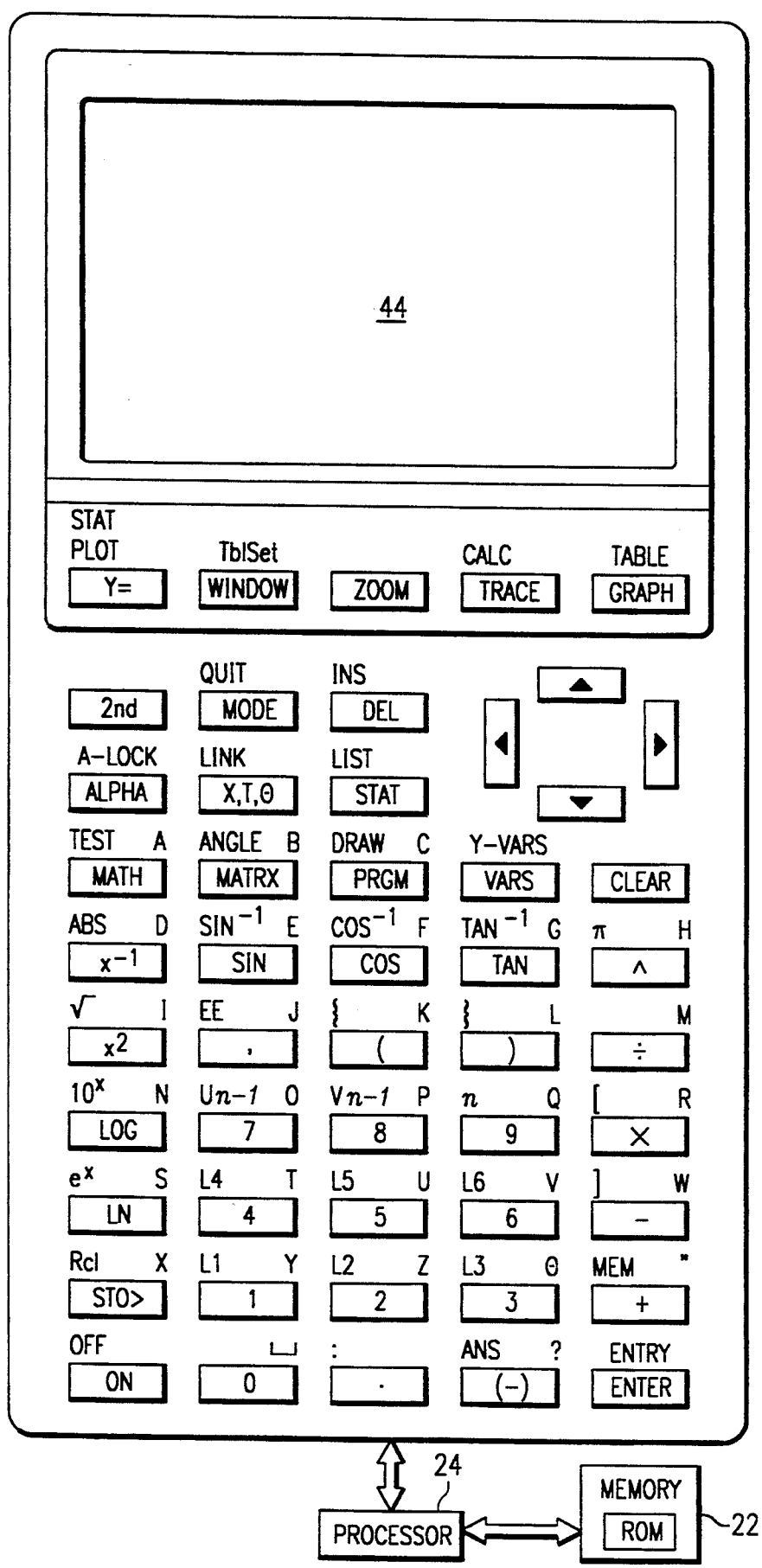
FIG. 3 shows an alternative embodiment of the calculator of FIG. 1.

To generate a solution for the nth term (here, the second term, since n=2), the "NO" key is pressed in response to the "REVIEW YN? "prompt. The solution to the nth term, here the second term, is now displayed as shown in block 40. The solution and the value of n can be alternately displayed by pressing the correct cursor or arrow key, "down" or "up", as shown on the display 28. For example, the "down" arrow key is displayed as shown in block 40. This display indicates that depressing the "down" cursor key will display the value of n as shown in block 41. Similarly, the display of block 41 indicates that depressing the "up" cursor key will toggle the display back to the solution as shown in block 40. FIG. 3 shows an alternative embodiment of calculator 20. In this alternative embodiment, calculator 20 has a text and graphics display 44 for displaying mathematical and graphical representations of a numerical sequence. Calculator 20 also has an interface in the form of a keyboard shown generally at 46 for entering the terms of a numerical sequence and controlling the functions of the calculator 20. Interface 46 uses the "2nd" key to invoke the function indicated above and to the left of a key, and uses the "ALPHA" key to invoke the function indicated above and to the right of a key.

In operation, the alternative embodiment of calculator 20 operates in a similar fashion to that of the embodiment of FIG. 1 described above. One significant difference is that the calculator 20 of the alternative embodiment can display the numerical sequence in graphical form. This is because display 44 is a bit map type of display, where each pixel may be individually turned "on" or "off".

Another significant difference is that the alternative embodiment can solve the terms of two sequences contemporaneously, unlike the first embodiment which could only solve for the terms of one sequence at a time.

Referring to FIG. 4, the mathematical notation form of the numerical sequence whose terms are to be solved is entered into memory 22 via interface 46 and processor 24. The "MODE" key is first pressed, causing calculator 20 to display a menu 48. Then, the "down" cursor key is pressed consecutively three times until the third line of the menu 48 (beginning with the word "Func") is reached. The "right" cursor key is then pressed three consecutive times until the cursor highlights the word "Seq". The "ENTER" key is then pressed, after which menu 48 is highlighted as shown. Pressing "ENTER" instructs calculator 20 to enter the sequence mode and to prepare to receive the mathematical expression of the numerical sequence.

The next step is to enter the numerical sequence into memory 22. To enter a numerical sequence, a menu variable key, which in the embodiment of FIG. 3 is the "Y=" key, is pressed. This results in the display as shown in block 50. By pressing the sequence of keys shown between blocks 50 and 52, the same numerical expression as above, $U_n=0.5*(U_{n-1}+2/U_{n-1})$, is entered. To enter the same or another expression for $V_n$, the "down" cursor key would be depressed to highlight $V_n$ and the appropriate keys would be pressed to enter the sequence.

FIG. 5 shows an alternative way to enter a sequence into memory 22. In this alternative method, the sequence is entered from the "home screen" (i.e., the calculator's general purpose calculation mode screen). The sequence is entered by depressing the keys as shown at the top of FIG. 5, resulting in the display as shown in block 54. After the sequence (enclosed in quotes) is entered and the "STO>" key pressed, the "Y-VARS" key is pressed as shown in FIG. 5. This displays the menu as shown in block 56, and the "down" cursor key must be pressed three times in order to highlight the fourth choice which is "Sequence". Pressing the "ENTER" key causes the display of block 58 to appear, at which time the variable ($U_n$ or $V_n$) to store the previously entered numerical sequence, as shown in block 54, is chosen by using the cursor keys. When the desired variable is highlighted, the "ENTER" key is pressed. In FIG. 5, the variable "$U_n$" was chosen and the "ENTER" key was pressed, generating the display of block 60.

Figures 6, 7:
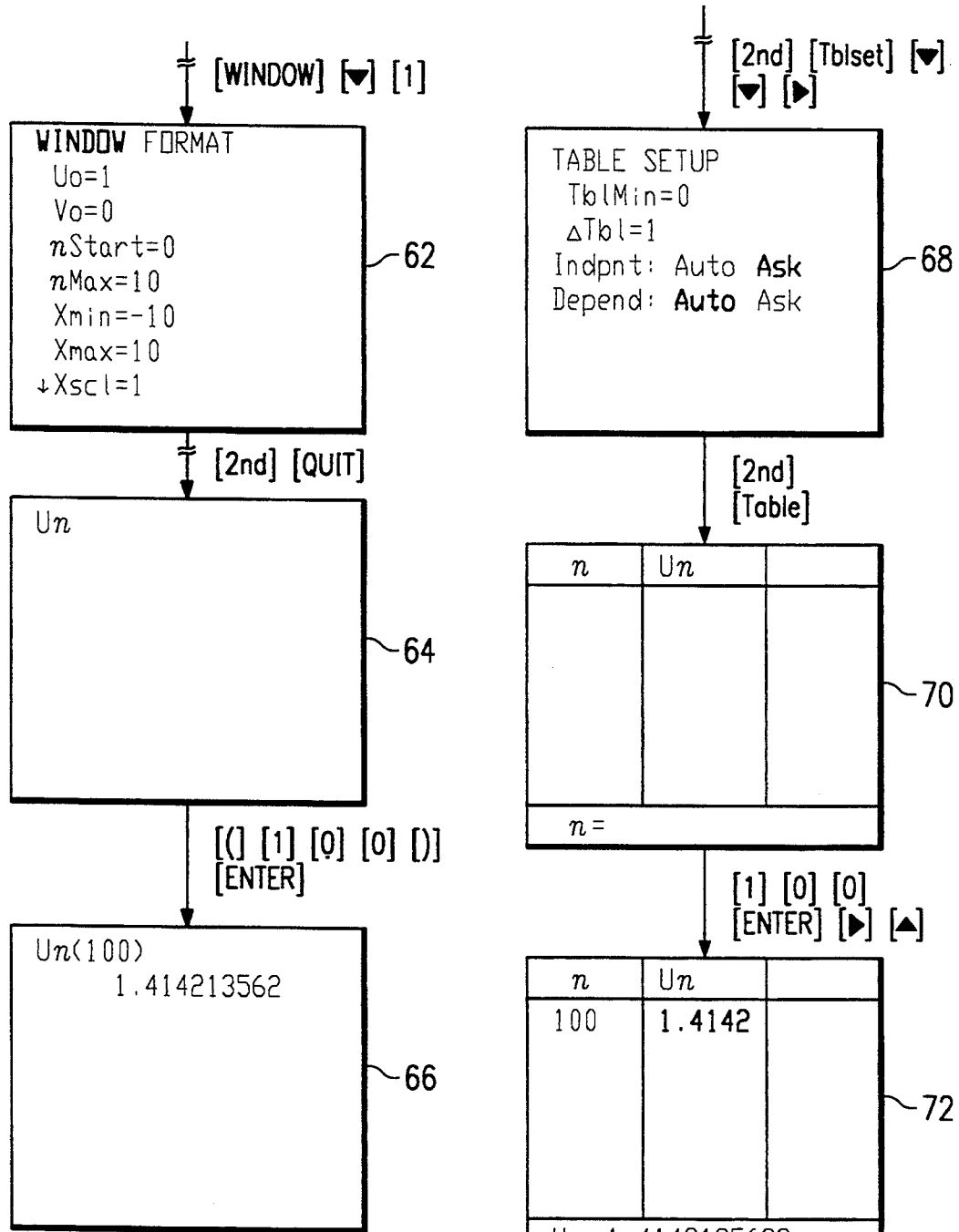
FIG. 6 illustrates a procedure for generating a solution of a desired term of the example numerical sequence using the calculator of FIG. 3.
FIG. 7 illustrates an alternative procedure for generating a solution of a desired term of the example numerical sequence using the calculator of FIG. 3.

FIG. 6 illustrates one way of solving for a desired term of a numerical sequence entered as described above. The "WINDOW" key is first depressed to enter the window menu as shown in block 62. The values for the variable shown in this menu are then entered. For instance, block 62 shows the initial condition $U_0=1$ after pressing the "WINDOW", "down*" cursor and "1" keys. The default value for $U_0$ is zero. Again, the values of the variables shown in the window menu are selected by using the cursor keys and entering the desired values using keypads of interface 46.

After setting the window menu variables, the "home screen" is returned to by pressing the "2nd" and "QUIT" keys. The variable "$U_n$" is obtained from the "Y-VARS" menu as explained above in conjunction with FIG. 5, blocks 56 and 58. This causes the "$U_n$" to appear on the display as shown in block 64. The identity of the term to be solved for is enclosed in parenthesis and entered as shown at the input to block 66. When "ENTER" is pressed, the value of $U_n$ at the value of the n enclosed in parenthesis is then displayed on the screen as shown in block 66. Here, the solution to $U_{100}$ was obtained and that solution is displayed in block 66.

Referring to FIG. 7, an alternative method for solving for a particular term of the numerical sequence is illustrated. The "TABLE SETUP" menu is entered by pressing the "2nd" key and then the "Tblset" key. The "down" cursor key is pressed twice and the "right" arrow key once until the term "Ask" in the line starting with "Indpnt:" is highlighted. To give a display as shown in block 68, the "ENTER" key is pressed. By pressing the "2nd" and "TABLE" keys, the display of block 70 is obtained.

Now the value of term identifier n, corresponding to the term a solution is desired for, is entered in the column marked "n". The "ENTER" key is then pressed and the solution is generated and displayed in the $U_n$ column. To give the display of block 72, with a more accurate representation of $U_n$ as displayed at the bottom, the "right" cursor key is pressed.

Referring to FIG. 8, it may be desired to solve for a large number of sequential terms. This is accomplished by entering the "TABLE SETUP" menu as described above in conjunction with FIG. 7, and selecting the "Auto" option for both the "Indpnt:" and "Depend:" variables in the menu. The table shown in FIG. 8 is displayed by pressing the "2nd" and the "TABLE" keys. Since the program is now in automatic mode, the table is automatically filled with values of n starting at the value set for "TblMin" of the "TABLE SETUP" menu of FIG. 7, and continues on in increments defined by "ΔTbl" also of "TABLE SETUP" menu of FIG. 7.

Referring again to FIG. 8, as the "down" cursor key is pressed, the cursor moves through the values of n and the value of n highlighted by the cursor appears in the bottom window or segment of the display as shown in block 74. As the cursor is moved beyond the value n=6, the screen of the display will scroll and begin to display higher values of n starting with n=7. This process can be continued to the calculator's computational limits for either n or $U_n$, whichever is reached first. In this way, the values of as many of the terms as desired can be viewed.

Referring to FIG. 9, it is often desired to test for convergence of a numerical sequence, i.e., to test whether the values of the terms of the sequence have a finite limit as n increases. FIG. 9 illustrates the table of solutions for the same example numerical sequence used above, $U_n = 0.5*(U_{n-1} + 2/U_{n-1})$. The sequence is entered into the calculator memory 22 in a manner similar to that explained above in conjunction with either of FIGS. 5 or 6. The table parameters would be set and the table display entered as described above in conjunction with FIG. 8. Referring again to FIG. 9, once the table display is entered, by using the "down" cursor key, one can scroll through the values of the terms of the numerical sequence. Block 76 is the display of the solutions for the terms n=7 through n=13. Block 78 is the display of the solutions for the terms n=14 through n=20. By viewing the terms of the numerical sequence in blocks 76 and 78, it is seen that the sequence converges to a value of approximately 1.4142. Higher values of n and corresponding values of $U_n$ could be displayed to get a more accurate value of convergence.

Figure 10:
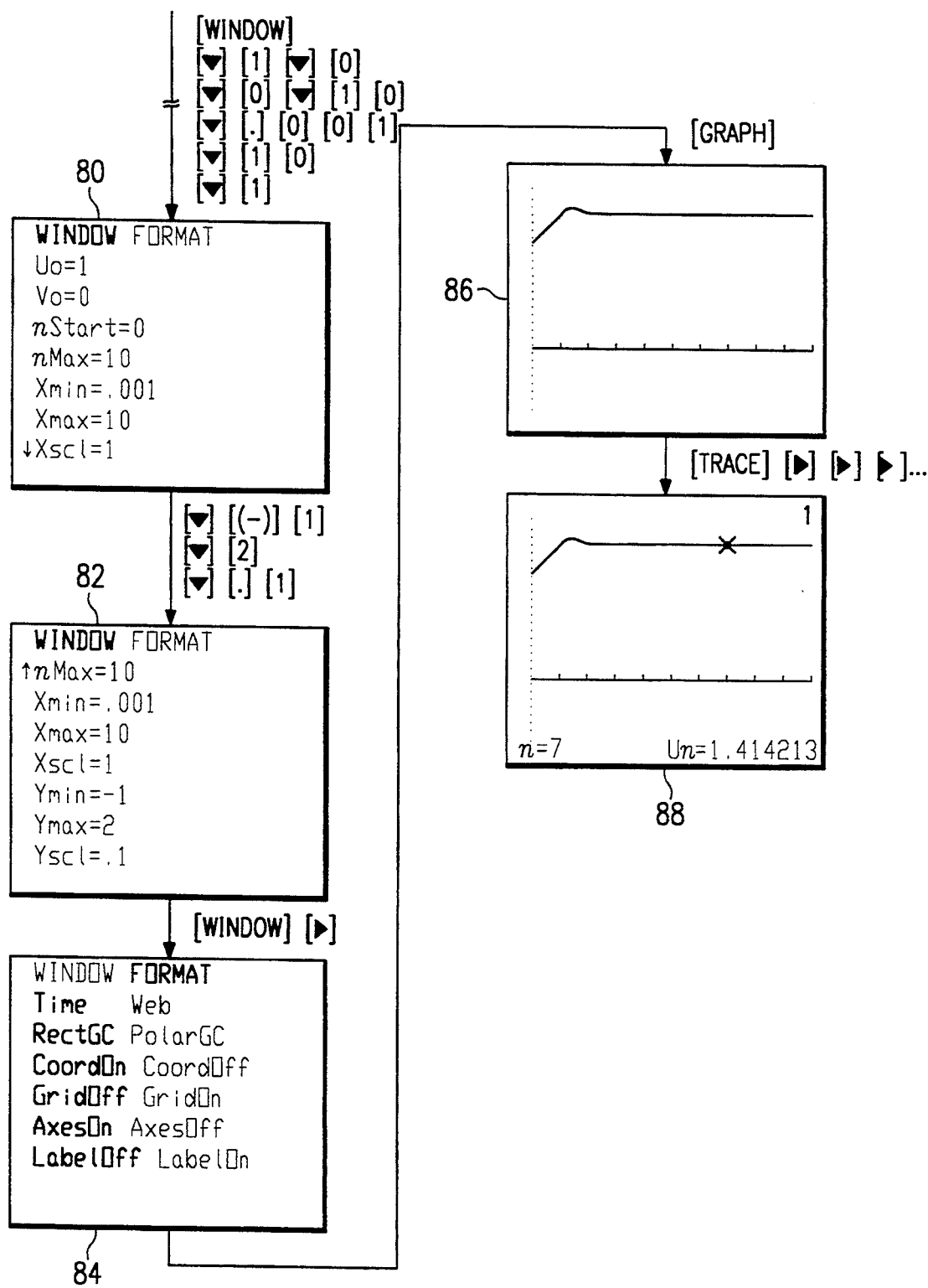
FIG. 10 illustrates a procedure for generating in time series graph form (n vs. $U_n$) the terms of the example numerical sequence using the calculator of FIG. 3.

FIG. 10 shows a second method for determining whether a sequence converges which is to plot the values of n against the values of $U_n$, commonly known as a time series graph. For example, the time series graph of the example numerical sequence can be generated. First the dimensions of the viewing window are set by setting the variables in the "WINDOW" menu. Appropriate values are selected for the variables shown in the "WINDOW" menu of blocks 80 and 82. These values are then entered by pressing the sequence of keys shown in FIG. 10 above block 80 and between blocks 80 and 82.

Next, the format of the graph display must be set. The "WINDOW" key is pressed followed by the "right" cursor key to display the "FORMAT" menu as shown in block 84. If the word "Time" is not already selected (i.e., highlighted), the appropriate cursor keys would be pressed so as to highlight the word "Time" and then the "ENTER" key is pressed, giving the display shown in block 84. With the "FORMAT" and "WINDOW" menu parameters set, the "GRAPH" key is pressed and calculator 20 generates and displays a time series graph of the example numerical sequence shown in block 86.

As shown in block 86, values of n are plotted along the horizontal axis and values of $U_n$ are plotted along the vertical axis. To determine the value of $U_n$ at a specific value of n, the "TRACE" key is pressed to give a display such as the one shown in block 88. By pressing the "right" cursor key, the calculator steps through the graph starting from n=0, incrementing n by one for each depression of the "right" cursor key. Information about the sequence is indicated in two ways. First, a marker is placed on the plot showing the coordinates of the intersection of the value of n and the value of $U_n$ for that particular term. The bottom of the display shows in text the value of n and the corresponding value of $U_n$. Here, the "right" cursor key has been depressed 7 times, giving n a current value of 7 and $U_n$ a current value of 1.414213.

Figure 11:
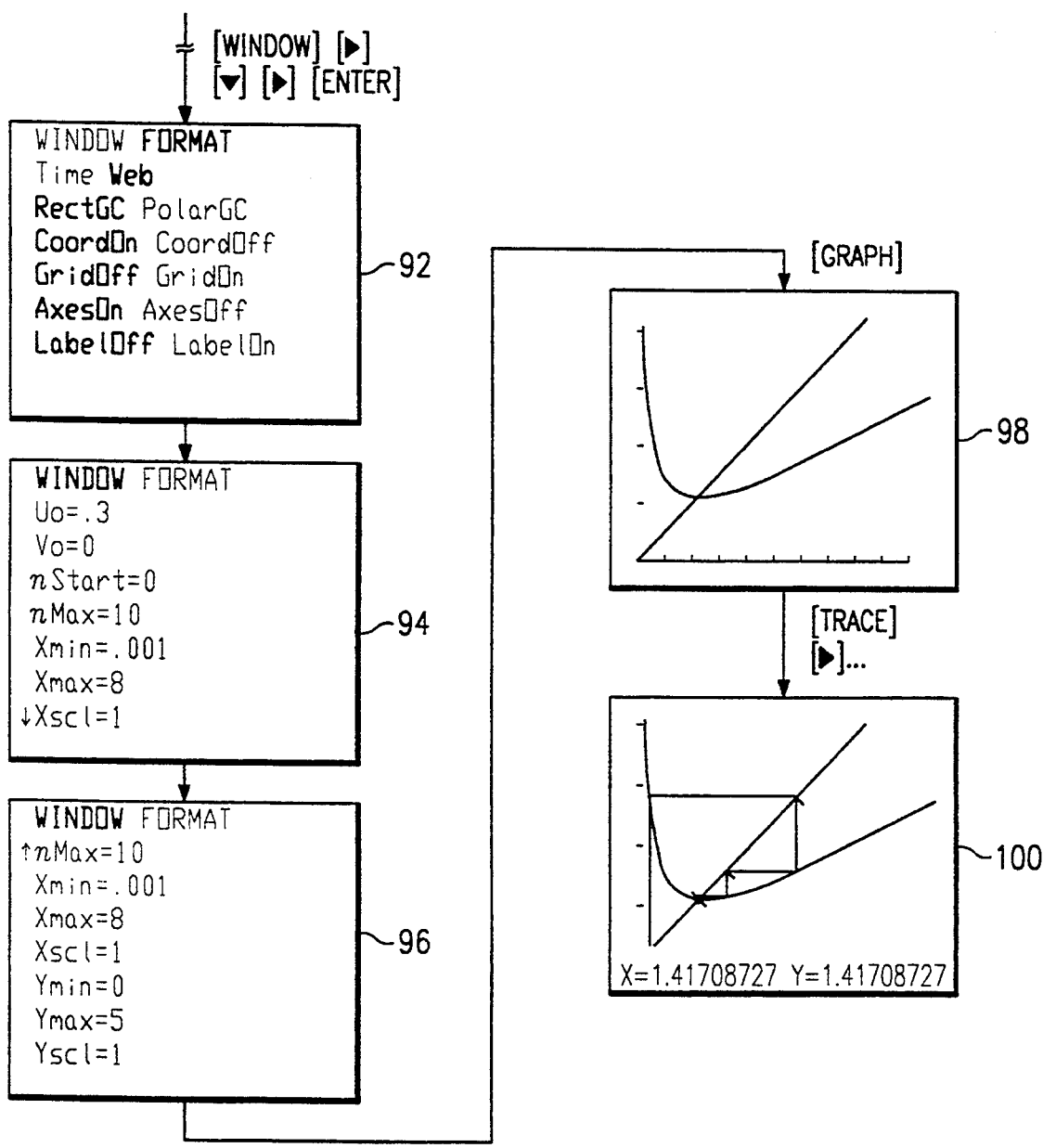
FIG. 11 illustrates a procedure for generating in web diagram graph form the terms of the example numerical sequence using the calculator of FIG. 3.

FIG. 11 shows a third method of determining whether the terms of a numerical sequence converge, which is by drawing a web diagram. Web diagrams, sometimes called cobweb or stairstep diagrams, are known in the art, and therefore will not be discussed here beyond their application as a method for determining convergence of the terms of a numerical sequence. The example numerical sequence used in conjunction with FIG. 11 is again $U_n = 0.5*(U_{n-1} + 2/U_{n-1})$. This sequence definition in mathematical notation form is entered into memory 22 of calculator 29 as described above in FIGS. 5 and 6.

To instruct the calculator 20 to display a web diagram, the "WINDOW" menu is entered by pressing the "WINDOW" key. By pressing the appropriate cursor keys, the "FORMAT" menu is displayed and "WEB" is selected, as shown in block 92.

Next, as blocks 94–96 illustrate, the cursor keys are used to select and change the values for the variables shown in the "WINDOW" menu. For this example, the values for the variables in the "WINDOW" menu are as shown in blocks 94–96. Note that the initial condition, $U_0$, for the sequence is set to equal "3".

Still referring to FIG. 11, when the "GRAPH" key is pressed, the basis of the web diagram is drawn on display 44 as shown in block 98. The basis of the diagram is a plot of the values $U_{n-1}$ (on the horizontal axis) against the values of $U_n$ (on the vertical axis), together with a plot of the line $y=x$. The "TRACE" key is then pressed to generate the first point on the web diagram which corresponds to $n=0$. To construct the diagram, the "right" cursor key is depressed. For every one depression of the "right" cursor key, one segment of the web diagram is displayed with the previous segments remaining on display 44. In this way, the construction of the web diagram can be stepped through from $n=0$ up through any value of n desired up to the calculator's computational limits. Block 100 shows a web diagram for the original sequence where the initial condition $U_0=0.3$. The bottom of the display shows numerically the current values of x and y for the most recently generated term of the numerical sequence.

Although the present invention and its advantages have been described in detail, it should be understood that various changes, substitutions and alterations can be made therein without departing from the spirit and scope of the invention as defined by the appended claims.

What is claimed is:

1. A digital computer for generating a solution solving for an unknown term of a numerical sequence made up of a plurality of terms, said digital computer comprising:

an input device having a plurality of actuatable input units including at least one dedicated input unit actuatable for identifying input data from other subsequently actuated input units to follow as input sequence data representative of a mathematical expression of a numerical sequence made up of a plurality of terms, the further actuation of said at least one dedicated input unit providing a term identifier representative of an unknown term of the numerical sequence for which a solution solving for the unknown term is to be provided;

memory means including a read-only-memory having a numerical sequence-solving program stored therein with a plurality of recognition instructions for recognizing a type of numerical sequence from a plurality of possible types of numerical sequences in response to input sequence data from actuated input units of said input device and a plurality of solution instructions for solving for the unknown term;

a processor operably interconnected to said input device and to said memory means for transmitting data from said input device to said memory means and for accessing data from said memory means for executing the recognition instructions and the solution instructions provided by the read-only-memory of said memory means to produce a solution solving for the unknown term; and a display operably interconnected with said processor for displaying the solution for the unknown term.

2. The digital computer of claim 1, wherein the read-only-memory of said memory means further stores prompting instructions for prompting a user for the numerical sequence and for data required to generate the solution.

3. The digital computer of claim 2 wherein the prompting instructions vary in response to the type of the numerical sequence.

4. The digital computer of claim 1 wherein said display is operable to display a graphical representation of the solution for the term of the unknown numerical sequence.

5. A digital computer as set forth in claim 1, wherein said at least one dedicated input unit is a single input unit providing, when actuated, a first input identifying input sequence data and a second input constituting a term identifier.

6. A digital computer as set forth in claim 1, wherein said input device comprises a keypad and the plurality of input units comprise a plurality of individual keys including at least one dedicated key actuatable for identifying input sequence data and for providing a term identifier.

7. A digital computer as set forth in claim 6, wherein said at least one dedicated key is a single dedicated key providing, when actuated, a first input identifying input sequence data and a second input constituting a term identifier.

8. The digital computer of claim 8, wherein said keypad has an increment key for incrementing the value of the term identifier.

9. A digital computer for generating a solution solving for an unknown term of a numerical sequence made up of a plurality of terms, said digital computer comprising:

a keypad having a plurality of selectively actuatable input keys for receiving input sequence data via actuation of the input keys representative of a mathematical expression of a numerical sequence made up of a plurality of terms and a value of a term identifier representative of an unknown term of the numerical sequence for which a solution solving for the unknown term is no be provided, the plurality of input keys including a sequence input key for receiving a previous term of the numerical sequence;

memory means including a read-only-memory having a numerical sequence-solving program with a plurality of recognition instructions for recognizing a type of numerical sequence from a plurality of possible types of numerical sequences in response to input sequence data from actuated input keys of said keypad and a plurality of solution instructions for solving for the unknown term;

a processor operably interconnected to said keypad and to said memory means for transmitting data from said input keys to said memory means and for accessing data from said memory means for executing the recognition instructions and the solution instructions provided by the read-only-memory of said memory means to produce a solution solving for the unknown term; and a display operably interconnected with said processor for displaying the solution for the unknown term.

10. The digital computer of claim 9, wherein said keypad has a sequence activation key for activating the sequence-solving program of the read-only-memory of said memory means.

11. The digital computer of claim 9 wherein said keypad has a term identifier key for entering the term identifier into said memory means.

12. The digital computer of claim 9 wherein said keypad has an increment key for incrementing the value of the term identifier.

13. A method of employing a digital computer for generating a solution solving for an unknown term of a numerical sequence made up of a plurality of terms, said method comprising the steps of:

entering input data as input sequence data representative of a mathematical expression of a numerical sequence made up of a plurality of terms into the computer;

reviewing the input sequence data and recognizing a type of numerical sequence from a plurality of possible types of numerical sequences based upon the input sequence data;

prompting the user for term input data, depending upon which type of numerical sequence has been recognized, for identifying an unknown term of the numerical sequence for which a solution solving for the unknown term is to be provided; and generating the solution solving for the unknown term.

14. The method of claim 13 further comprising the steps of:

incrementing the term identifier in response to an increment key; and generating a solution after each incrementation of the term identifier.

15. The method of claim 13 wherein said prompting step is prompting for entry of an initial condition for an initial term of the numerical sequence.

16. The method of claim 13, further comprising the step of activating a numerical sequence-solving program in response to a sequence activating key and thereafter reviewing the input data and recognizing a type of numerical sequence as part of the numerical sequence-solving program.

17. The method of claim 13, further comprising the steps of:

receiving an expression for a second numerical sequence, having a second term identifier, entered into the computer, via an interface;

receiving a second value entered into the computer via the interface for the second term identifier; and generating a solution solving for an unknown term of the second numerical sequence corresponding to the second value.

18. The method of claim 13 further comprising the step of generating a graphical expression of the solution.

19. A method as set forth in claim 13, further including the step of:

alerting the computer to expect input data to be received thereby as input sequence data representative of the mathematical expression of the numerical sequence prior to the entry of the input sequence data into the computer.

20. A method as set forth in claim 13, wherein the step of prompting the user for term input data further comprises:

choosing by the user between a default decision as to the unknown term and a user-selected unknown term;

if the term default decision is chosen, automatically generating a default unknown term by the computer;

alternatively, if the user-selected unknown term is chosen, prompting the user to input a value for the unknown term; and thereafter generating the solution solving for the unknown term.

\* \* \* \* \*